Jan. 3, 1967 R. H. MUHE 3,295,502

CATTLE OILING DEVICE

Filed Aug. 9, 1965

INVENTOR.
Richard H. Muhe
BY
Sam J. Slotsky
ATTORNEY

3,295,502
CATTLE OILING DEVICE
Richard H. Muhe, Walthill, Nebr. 68067
Filed Aug. 9, 1965, Ser. No. 478,169
2 Claims. (Cl. 119—157)

My invention relates to a cattle oiling device.

An object of my invention is to provide a cattle oiling device which operates efficiently when the cattle or other stock animals pass under the same.

A further object of my invention is to provide an adjustable arrangement which is positive in operation, and which automatically feeds the oil or insecticide, etc. upon movement of the animal.

Figure 1:
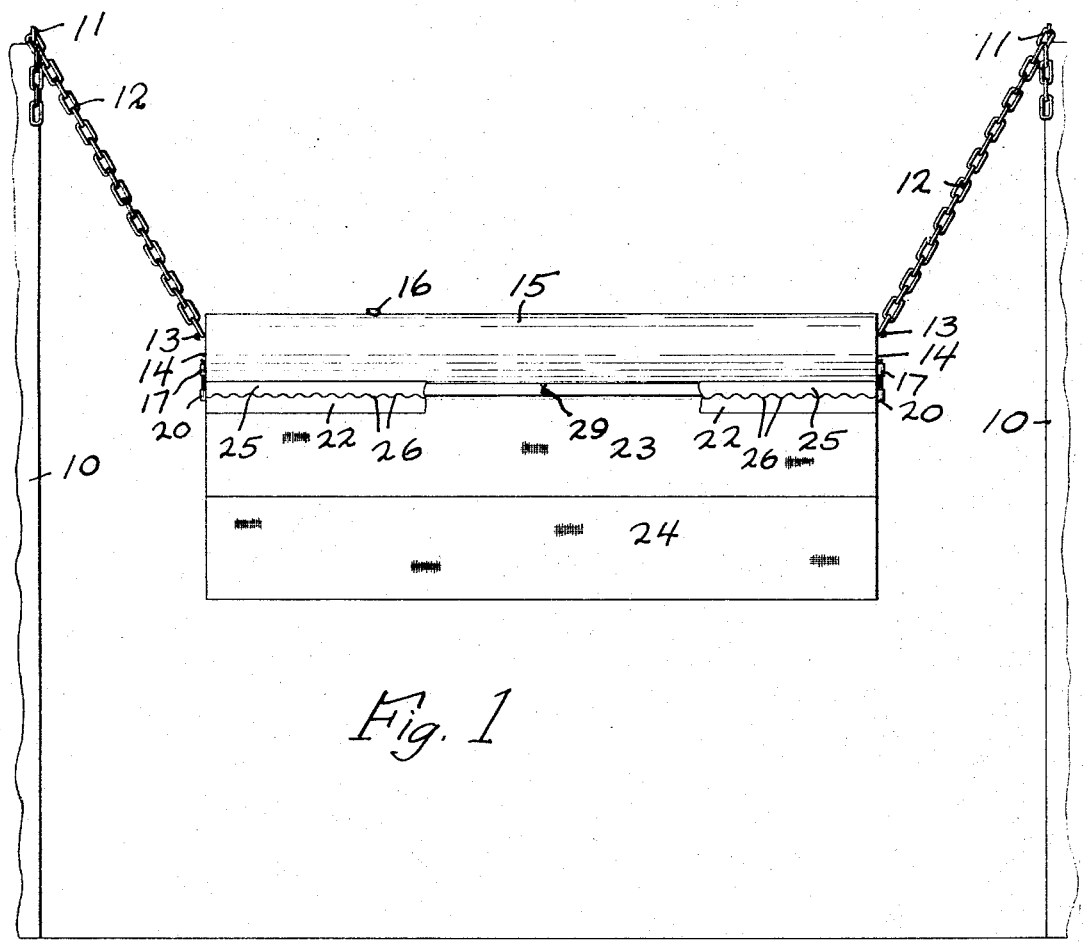
Figure 2:
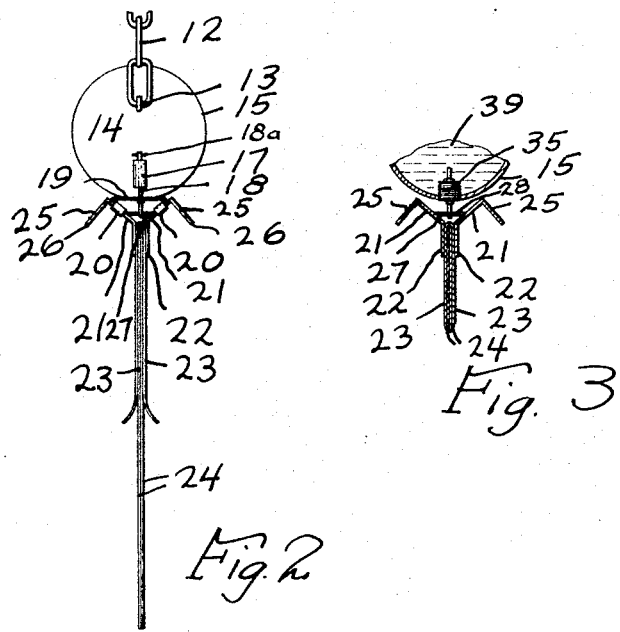
Figure 3:
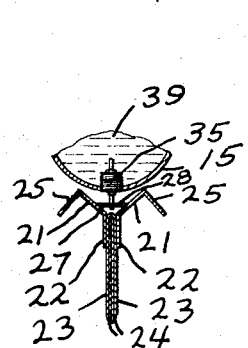
Figure 4:
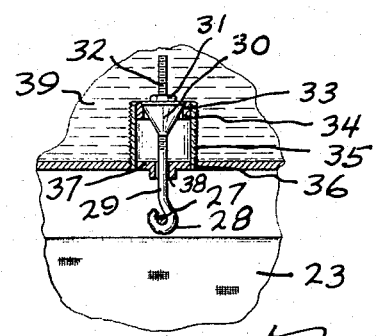

With these and other objects in view, my invention consists in the construction, arrangement, and combination of the various parts of my device, whereby the obects contemplated are attained, as hereinafter more fully set forth, pointed out in my claims, and illustrated in the accompanying drawings, in which:

FIGURE 1 is a forward elevation of my device,
FIGURE 2 is an end view of FIGURE 1,
FIGURE 3 is a sectional view, and
FIGURE 4 is an enlarged sectional detail.

My invention contemplates the provision of a cattle oiler which can be of relatively simple construction and which will operate efficiently for the purposes intended.

In describing my invention I have used the character 10 to designate a pair of spaced posts or any other supports, and attached to the posts 10 are the upper hooks 11 which are adapted to receive any of the links of the chains 12, which chains are attached at 13 to the end plates 14 of the cylindrical horizontal pipe or tube 15 having a filling plug at 16, through which filling plug can be poured the insecticide or other liquid which is to be spread on the animal's hide.

I have further used the character 17 to indicate small tubes attached to the end plates 14 which tubes slidably receive the rods 18 which are secured to the transverse further rods 19 which are bent, and are secured to the small tubular members 20 which members 20 are attached to the ends of the sheet metal lengthened strap members 21 which include the downwardly projecting portions 22 which are securely attached to an upper overlapping fabric member 23, and to the inner wider fabric member 24, it being noted that these fabric members are doubled as shown in FIGURE 2, the members 23 and 24 being suitably porous in order to retain the insecticide or other oil.

Extending from the members 21 are the portions 25 bent substantially at right angles thereto, or if desired the members 25 can be provided as separate pieces, the members 25 including the serrated portions 26, it being noted that the various members 21, 22 and 25 extend the entire length of the tube 15.

Attached across the center point of the members 21 is a transverse rod 27, which is loosely received within the eye portion 28 of a valve stem member 29 which is attached to the tapered member 30 (see FIGURE 4) by means of the nut 31 which is threadably engaged with the end 32 of the member 29, the tapered member 30 being adapted to snugly engage the tapered surface 33 of the member 34 which is secured to the coupling 35 which is threadably engaged at 36 with the tube 15, the character 37 indicating a lower member having the opening 38 for loosely receiving the rod 29.

The device operates in the following manner: As the cattle, etc., pass beneath the device, the members 23 and 24 will naturally deposit the oil or other fluid onto the hide of the animal for the proper effect of reducing the insects as well as the other beneficial effects obtained, and also the animal's hide will abut against the serrations 26 to provide a pleasing scratching effect, and during such action the transverse rod 27 will be constantly raised and lowered which will corerspondingly open and close the member 30, and during each raising action will cause a certain amount of the oil 39 to flow downwardly, and through the space between the stem 29 and the opening 38 which oil will flow onto the fabric surfaces 23 and 24 so that there will be a constant supply of oil to be distributed onto the hide of the creature.

The cotter key 18a is attached to the upper end of the rod 18, this arrangement thereby supporting the lower movable parts 21, 23, 24, etc.

The end members 17 and 18 insure that the upward and downward motion is vertical at all times, and the chains 12 can be regulated to any desired length for vertical adjustment of the unit and it will now be noted that I have provided the various advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may reasonably be included within their scope.

I claim as my invention:

1. A cattle oiling device comprising a horizontally positioned substantially lengthened tube adapted to contain oil therein, means for supporting said tube at each end thereof, a pair of spaced angularly positioned strap members positioned beneath said tube, means movably securing the strap members with the tube, porous fabric members attached between said strap members, said fabric members including an upper outer folded member, and an inner folded member projecting downwardly beyond said upper member, said strap member including a serrated member attached thereto, a transverse rod attached to said strap members at the mid-points thereof, a valve rod having a lower eye portion receiving said transverse rod, a tapered valve member attached to the upper end of said valve rod, a coupling member secured within the tube having a tapered surface in abutment with said tapered valve member, movement of said strap members being adapted to move said valve rod whereby said tapered member will rise above said tapered surface to allow oil to escape from said tube.

2. A cattle oiling device comprising a horizontally positioned substantially lengthened tube adapted to contain oil therein, means for supporting said tube at each end thereof, a pair of spaced angularly positioned strap members positioned beneath said tube, means movably securing the strap members with the tube, porous fabric members attached between said strap members, said fabric members including an upper outer folded member, and an inner folded member projecting downwardly beyond said upper member, said strap member including a serrated member attached thereto, a transverse rod attached to said strap members at the mid-points thereof, a valve rod having a lower eye portion receiving said transverse rod, a tapered valve member attached to the upper end of said valve rod, a coupling member secured within the tube having a tapered surface in abutment with said tapered valve member, movement of said strap members being adapted to move said valve rod whereby said tapered member will rise above said tapered surface to allow oil to escape from said tube, guide members attached to the ends of said strap members for providing vertical motion of said strap members.

References Cited by the Examiner

UNITED STATES PATENTS

| | | | |
|---|---|---|---|
| 934,571 | 9/1909 | Reckards | 119—157 |
| 987,433 | 3/1911 | Crawford | 119—157 |
| 2,983,252 | 5/1961 | Hesse | 119—157 |

SAMUEL KOREN, *Primary Examiner.*

HUGH R. CHAMBLEE, *Examiner.*